United States Patent [19]

Bertocci et al.

[11] Patent Number: 5,689,549
[45] Date of Patent: Nov. 18, 1997

[54] CORDLESS TELEPHONE BASE UNIT ARRANGED FOR OPERATING WITH MULTIPLE PORTABLE UNITS

[75] Inventors: Guido Bertocci, Freehold; William J. Nealon, Neptune City; Siegfried F. Rehwinkel, Middletown; Walter Tomkoski, Jamesburg; Hon-Chi Yu, Aberdeen, all of N.J.

[73] Assignee: Lucent Technologies Inc., Murray Hill, N.J.

[21] Appl. No.: 347,745

[22] Filed: Dec. 1, 1994

[51] Int. Cl.⁶ .................................................. H04Q 7/20
[52] U.S. Cl. ............................ 379/61; 379/58; 379/62
[58] Field of Search ............................ 379/60, 61, 62, 379/63, 58, 34.1; 455/33.2

[56] References Cited

U.S. PATENT DOCUMENTS

| | | | |
|---|---|---|---|
| 4,736,404 | 4/1988 | Anglikowski et al. | 379/62 |
| 4,878,238 | 10/1989 | Rash et al. | 379/62 |
| 5,020,094 | 5/1991 | Rash et al. | 379/62 |
| 5,243,641 | 9/1993 | Evans et al. | 379/61 |
| 5,325,420 | 6/1994 | Kikuchi | 379/61 |
| 5,371,782 | 12/1994 | Casey, III et al. | 379/61 |
| 5,388,212 | 2/1995 | Gube et al. | 395/200 |
| 5,448,764 | 9/1995 | Sondermann et al. | 455/88 |
| 5,500,888 | 3/1996 | Chiu et al. | 379/61 |

Primary Examiner—Dwayne Bost
Assistant Examiner—Nay Maung
Attorney, Agent, or Firm—Samuel R. Williamson

[57] ABSTRACT

A cordless telephone system includes an arrangement wherein multiple portable units operate with a common base unit using the same security code without conflict or confusion. When a portable unit attempts to establish a radio link with the base unit, for example, this originating portable unit generates a random number which is retained by this unit and also transmitted to the base unit. This random number is substituted for the common stored security code, then shared by the base unit and all of the portable units, for creating a temporary unique security code that is known only to the base unit and the originating portable unit. Interference from other portable units attempting to gain access to the base unit while the originating portable unit is actively communicating with the base unit is thereby advantageously prevented.

30 Claims, 5 Drawing Sheets

CORDLESS TELEPHONE BASE UNIT ARRANGED FOR OPERATING WITH MULTIPLE PORTABLE UNITS

BACKGROUND OF THE INVENTION

1. Technical Field

This invention relates to cordless telephones and, more particularly, to a cordless telephone having a plurality of portable units arranged for communicating with a base unit.

2. Description of the Prior Art

Cordless telephone systems presently available in the art include multiple portable units that operate with a single base unit. An example of such a telephone system is described in U.S. Pat. No. 5,325,420. Although such cordless telephone systems exist in the art, the number of portable units that operate easily with a single base is generally limited, typically to two or three units. This is due primarily to a popular architecture that requires the base unit to keep track of the number of portable units in the system in order to assign information such as a unique security code to each portable unit. One disadvantage of requiring the base unit to store a "list" in memory is that for each additional portable unit in the system, more memory is required in the base unit. Another disadvantage of storing such a list in the base unit is that if one portable unit becomes defective, or is otherwise unavailable, the information for the single unavailable portable unit is not easily deleted from the list of information on portable units maintained in memory by the base unit. By way of example, if one portable unit becomes defective and is replaced by another portable unit or even repaired, the list in the base unit, unfortunately, continues to grow in size.

One system in the known art employs two specific portable units that are designated during manufacture as a first configured portable and a second configured portable unit, each of which is then mated with a specific base unit. These units are sold as an assembly wherein the base unit operates only with one of the first configured portable units and one of the second configured portable units. These portable units are not easily interchanged, however. For example, a base unit in this system does not operate with two first configured portable units nor does it operate with two second configured portable units without major circuit reconfiguring of such base unit.

In another cordless telephone system having multiple portable units arranged for operation with a single base unit, a common security code used in establishing communications between the base unit and a portable unit is programmed in read only memory (ROM) in the base unit at the factory and also into ROM in the portable units that accompany this base unit. Since all portable units in this system must have the same security code for proper operation, customers are required to purchase the system as a complete ensemble rather than having the option of purchasing additional portable units for use in the system at some future time. Moreover, if a portable unit ever becomes inoperative in this system, a user is unable to easily replace the defective portable unit with another portable unit having the same security code.

Although the above-described cordless telephone systems wherein multiple portable units are able to communicate with a single base do provide cordless telephone communications, they do so only with the described limitations. It is desirable therefore to have a cordless telephone system wherein multiple portable units communicate with a single base without these limitations.

SUMMARY OF THE INVENTION

In accordance with the invention, a cordless telephone system includes an arrangement which achieves optimum utilization of multiple cordless telephone portable units for communicating with a common base unit.

In accordance with a first aspect of the invention, a unique temporary random security code is generated by a first portable unit actively communicating with the base unit. This security code is transmitted to the base unit which then ignores any communications attempts from a second portable unit not having this temporary security code. Interference from other portable units attempting to gain access to the base unit while the first portable unit is actively communicating with the base unit is advantageously prevented.

In accordance with a second aspect of the invention, the cordless system includes an operation that permits different portable units to separately gain access to the base unit while a telephone call with a distant party is ongoing. This operation, which in effect mounts to a transfer of a telephone call, may take place when a call is placed on hold or any time that the control of the radio communications link needs to be transferred from one portable unit to another.

In accordance with a third aspect of the invention, a registration procedure is provided which permits a user to configure the base unit and all portable units intended for operation in the cordless telephone system with the same security code information at the same time. If an additional portable unit is to be registered with the base unit at some subsequent time, this is also easily achievable through this registration procedure.

BRIEF DESCRIPTION OF THE DRAWINGS

The invention and its mode of operation will be more clearly understood from the following detailed description when read with the appended drawing in which.

Throughout the drawing, the same element when shown in more that one figure is designated by the same reference numeral.

DETAILED DESCRIPTION

Figure 1:
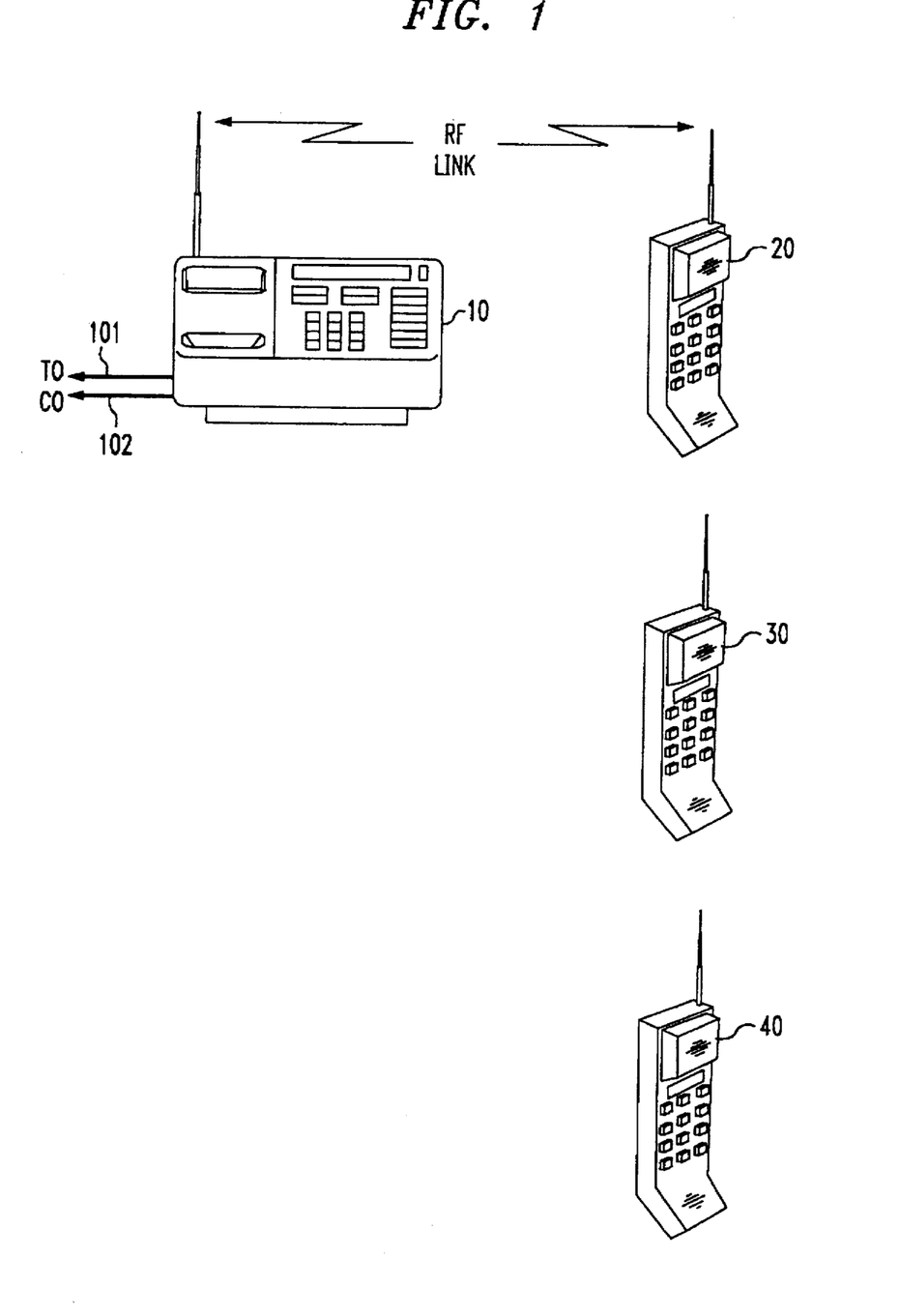
FIG. 1 shows a cordless telephone base unit and multiple portable units for communicating with the base unit.

Referring now to FIG. 1 of the drawing, there is shown a cordless telephone base unit 10 which provides access to a telephone central office (not shown) over tip-ring lines 101-102, and multiple portable or handset units 20 through 40. Although only three handset units are shown and described herein, it is to be understood that a greater or fewer number of handset units may be employed in practicing the principles of this invention.

In accordance with the disclosed embodiment, each of the handset units 20 through 40 may securely access the base unit 10 and share a common telephone line through this base unit. Although a radio frequency (RF) link is shown as existing only between base unit 10 and handset unit 20, such RF link may be established between the base unit and any of the handset units 20, 30 or 40. Thus, incoming telephone calls received at the base unit 10 from the central office may be answered by a person at either of the handsets 20 through 40. Similarly, a user of either of the handset units 20 through 40 may originate a call to go over the tip-ring lines 101-102 to the central office.

Figure 2:
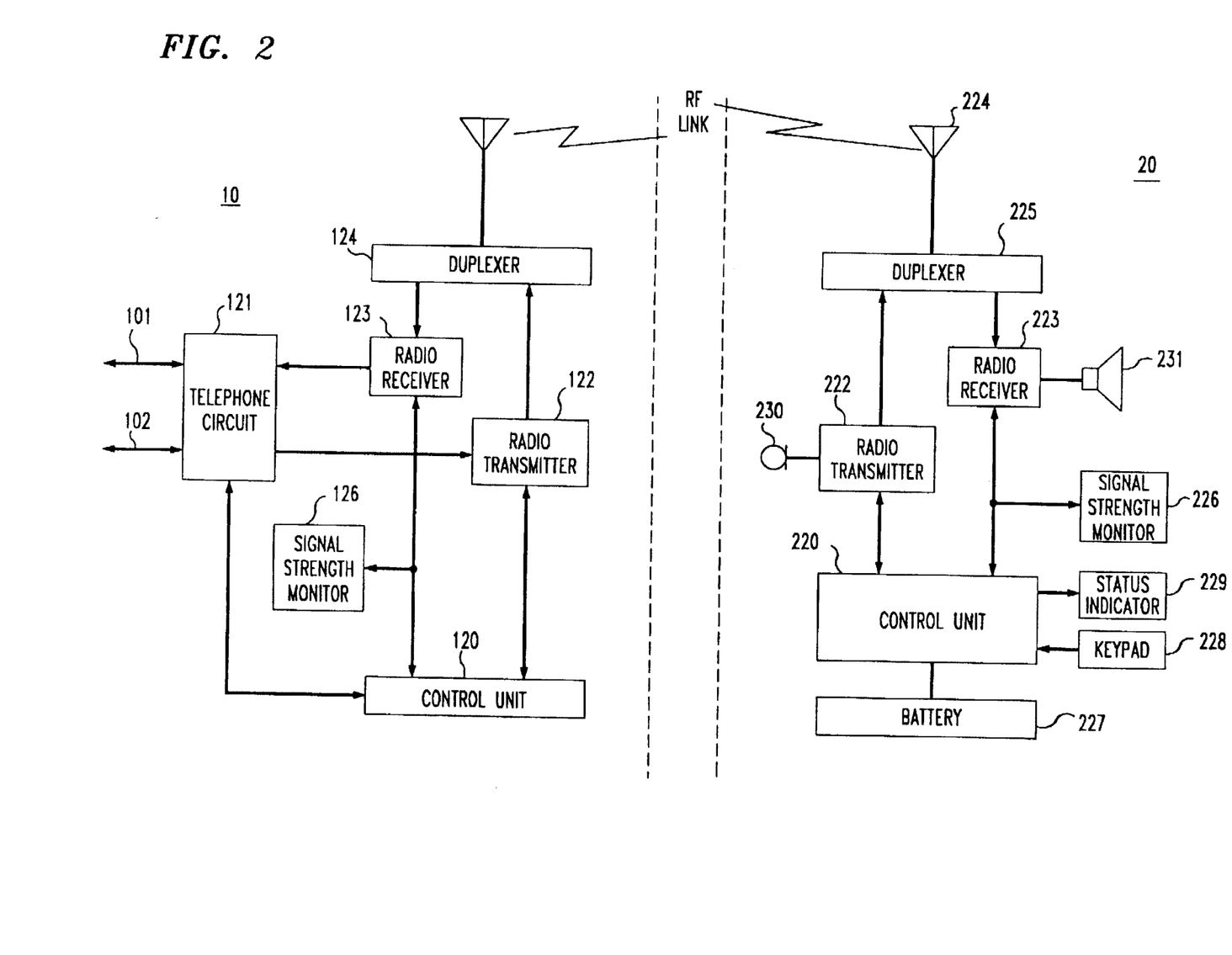
FIG. 2 is a functional block representation of a cordless telephone base unit and portable unit both operative in accordance with the principles of the present invention.

Referring next to FIG. 2, there is shown a block representation of the major functional components of the base unit 10 and the handset unit 20, both depicted in FIG. 1 and operative over a plurality of communication channels. With regard to the functional components illustratively described in handset unit 20, handset units 30 and 40 incorporate these same components and are operationally identical.

Included in the base unit 10 is a control unit 120 which advantageously provides a number of control functions. The control unit 120 generates security code and frequency channel data, which includes data indicative of an active channel and a service channel, during a registration procedure for subsequent use by the base unit 10 in communicating with the handset unit 20. The active channel is the channel used by both the base unit and the handset unit for normal voice communications and for transmitting and receiving opcodes for executing identified functions. The service channel is the channel used by the base unit and the handset unit for respectively transmitting and receiving information indicative of the current active channel. Use of the dual channel process allows both the freedom to dynamically change channels as needed to avoid interference while simultaneously providing a capability to resynchronize any handset unit with the base unit on the active channel. An arrangement suitable for use in selecting an active channel free of interference is described in U.S. Pat. No. 5,044,010 which issued to R. Frenkiel on Aug. 27, 1991, this patent being incorporated herein by reference.

In accordance with the inventive embodiment, the service channel and the active channel may be one and the same. If, by way of example, in response to interference, the channel determined to be the clearest channel is also the service channel, then this channel is then automatically selected by the base unit during a channel change routine as the active channel or, alternatively, inserted as the next channel for selection as the active channel when a user manually performs the channel change by pressing a suitably designated button. Thus, the number of communication channels over which the cordless telephone may operate is not limited in any way by employing both an active channel and a service channel. Rather, all communication channels remain available for voice communcations as long as they do not contain interference.

The security code data generated by control unit 120 must be communcated to the control unit 220 in the handset unit 20 and to the control units in all the other handset units in order for the base unit to be able to communicate with these handset units and the handset units, in turn, to be able to communicate with the base unit. During each registration procedure, the base unit chooses a random security code that remains unchanged until a user performs a special key sequence or, alternatively, presses a dedicated button, to perform another registration procedure, thereby changing the security code again. The registration data in both the base unit and handset units is advantageously stored in nonvolatile memory to provide robustness in case of power loss or any other condition that might corrupt this information.

In a first type of registration procedure, usable in accordance with the disclosed embodiment, control unit 120 interfaces with a control unit 220 in the handset unit 20 while the handset unit 20 is located in a mating cradle in the base unit 10. In this registration procedure, both the security code and frequency channel data is transferred to the control unit 220 in accordance with the teachings of U.S. Pat. No. 4,736,404 issued to R. E. Anglikowski, et al. on Apr. 5, 1988, this patent being incorporated herein by reference. Once in the registration mode, each handset unit is cradled to receive the same security code and frequency channel information. After each handset unit is configured with this information, the base unit is returned to the normal mode of operation.

In a second type of registration procedure, usable in accordance with the disclosed embodiment, the control unit 120 in the base unit 10 communicates with the control unit 220 in the handset unit 20 after the handset unit and base unit have been configured in a registration mode. While in this mode, the handset unit 20 is brought within close proximity to the base unit 10 and the registration procedure executed. During this registration procedure, all handset units intended for operation in the cordless telephone system are configured with the same security code and frequency channel information. Advantageously, if it is desired to register an additional telephone handset unit with the base unit at some subsequent time, this is also easily achievable with this registration procedure. A registration procedure suitable for use in registering the base unit and handset unit while in close proximity with each other is set forth in United States patent application Ser. No. 08/270,348 filed on Jul. 5, 1994, this application being incorporated herein by reference.

This control unit 120 also compares the received security code data with its stored security code data during the establishing of a two-way RF communications link between the handset unit 20 and the base unit 10. A favorable comparison of the data from the two security codes must be achieved in order for the base unit 10 to respond to a request-for-service signal from a handset unit. This control unit 120 also receives and processes opcode data provided by the handset unit 20 for dialing and providing signaling information out to a central office or other appropriate switch via a telephone circuit 121 and over tip-ring lines 101 and 102. Control unit 120 may be implemented through the use of a microcomputer containing ROM, RAM and through use of the proper coding. Such a microcomputer is known in the art and is readily available from semiconductor manufacturers such as Signetics, Intel and AMD. The telephone circuit 121 serves as a "plain old telephone service" (POTS) interface for voice signals on the tip-ring lines 101 and 102 which are sent to transmitter 122 and received from receiver 123. A conventional power supply (not shown) provides operating power for all of the circuitry in the base unit 10.

In order for the base unit 10 to achieve effective coverage throughout its operating range, a signal strength monitor circuit 126 continually monitors the strength of the received signal from the handset unit 20 during ongoing communications with the handset unit 20. This signal strength monitor circuit 126 may be, for example, a received signal strength indicator (RSSI) circuit. This RSSI circuit produces an output voltage that is proportional to the strength of the received signal from the handset unit 20.

Responsive to the strength of the received signal from the handset unit 20, as determined by the signal strength monitor circuit 126, the control unit 120 regulates the amount of power transmitted by the transmitter 122 to the handset unit 20. Thus, when the handset unit 20 is in close proximity to the base unit 10, the level of power radiated by the radio transmitter 122 is reduced to a minimum acceptable level. And when the handset unit 20 is determined to be located near the fringe of the telephone's operating range, the level of power radiated by radio transmitter 122 is increased to its maximum permitted level.

Both the base unit 10 and the handset unit 20 are operable on a plurality of communication channels. The control unit 120 configures a radio transmitter 122 and a radio receiver 123 in the base unit 10 for proper operation on the active one of the plurality of channels when communicating with one of the plurality of handset units, for example, handset unit 20. The control unit 120 also provides the appropriate channel control information to the handset unit 20 over the active channel or, alternative, when necessary for the handset unit to locate the active channel, over the service channel.

The transmit and receive signals of the base unit 10 are coupled to a duplexer 125 which permits the transmitter 122 and the receiver 123 to both simultaneously operate over antenna 124 while preventing the output of transmitter 122 from being coupled directly to the input of the receiver 123. When the base unit is in an idle state awaiting an incoming telephone call or a request-for-service signal from a handset unit, transmitter 122 is turned off while receiver 123 remains on to detect the request-for-service signal.

Referring next to the handset unit 20, there is shown the control unit 220 which stores the security code data that is generated by the base unit 10 and provided to the handset unit 20. This security code data stored in control unit 220 is transmitted from the handset unit 20 to the base unit 10 while establishing initial communications through a request-for-service signal as well as during the transfer of subsequent opcode data to the base unit. These signals are transmitted in a frequency shift keying (FSK) format and includes a synchronizing signal immediately followed by a data field which includes the security code generated by the control unit 120. Like the control unit 120, this control unit 220 may be implemented through the use of a microcomputer containing ROM, RAM and through use of the proper coding. Such a microcomputer is known in the art and is readily available from semiconductor manufacturers such as Signetics, Intel and AMD.

Communications with the base unit 10 are provided via a radio transmitter 222 and a radio receiver 223 in the handset unit 20. The output of the transmitter 222 and input for the receiver 223 are commonly coupled through a duplexer 225 to an antenna 224. The receiver 223 demodulates voice signals transmitted by the base unit 10 and couples these signals to an acoustical device such as, for example, loudspeaker 321. The transmitter 222 has as its input speech signals from a microphone 230, security code data from control unit 220 and opcode data representative of entries on a keypad 228, all of which it transmits to the base unit 10. The keypad 228 is used for entering dial digits and control functions executable by the control unit 220 or transmitted to the base unit 10. A signal strength monitor circuit 226 is included in the handset unit 20 for continually monitoring the strength of the received signal from the base unit 10 during ongoing communications with the handset unit 20. A battery 227 is also included in the handset unit 20 for providing operating power for all circuitry in this unit.

A status indicator 229 is connected to the control unit 220 and provides an indication to the user of the handset unit when (1) a communications link has been established between the handset unit 20 and the base unit 10 and (2) a communications link cannot be established due to the handset unit being outside of the reception range of the base unit.

In order to conserve battery power, a controlled power up/power down mode of operation for the handset unit 20 is implemented in accordance with the teachings of U.S. Pat. No. 4,731,814 issued to W. R. Becker et al. on Mar. 15, 1988. The battery 227 in the handset unit 20 is normally charged while the handset unit is placed in a cradle located in, for example, its dedicated base unit. Such a cradle may also be an auxiliary charging cradle such as is described in U.S. Pat. No. 5,371,784 issued on Dec. 6, 1994, this patent being incorporated herein by reference. When the handset unit is removed from this base unit and is in an idle or standby state awaiting a telephone call, power to the control unit 220, receiver 223 and certain other selected circuitry in the handset unit 20 is controlled to minimize power consumption. Power to other non-essential circuitry in the handset unit 20 is turned completely off during this state. The handset unit automatically turns on to a full operating mode from the controlled power up/power down mode in response to events such as a user depressing a key on the keypad 228 or the receipt of a ring indication from a base unit, the ring indication being indicative of an incoming call directed to the handset unit.

Figure 3:
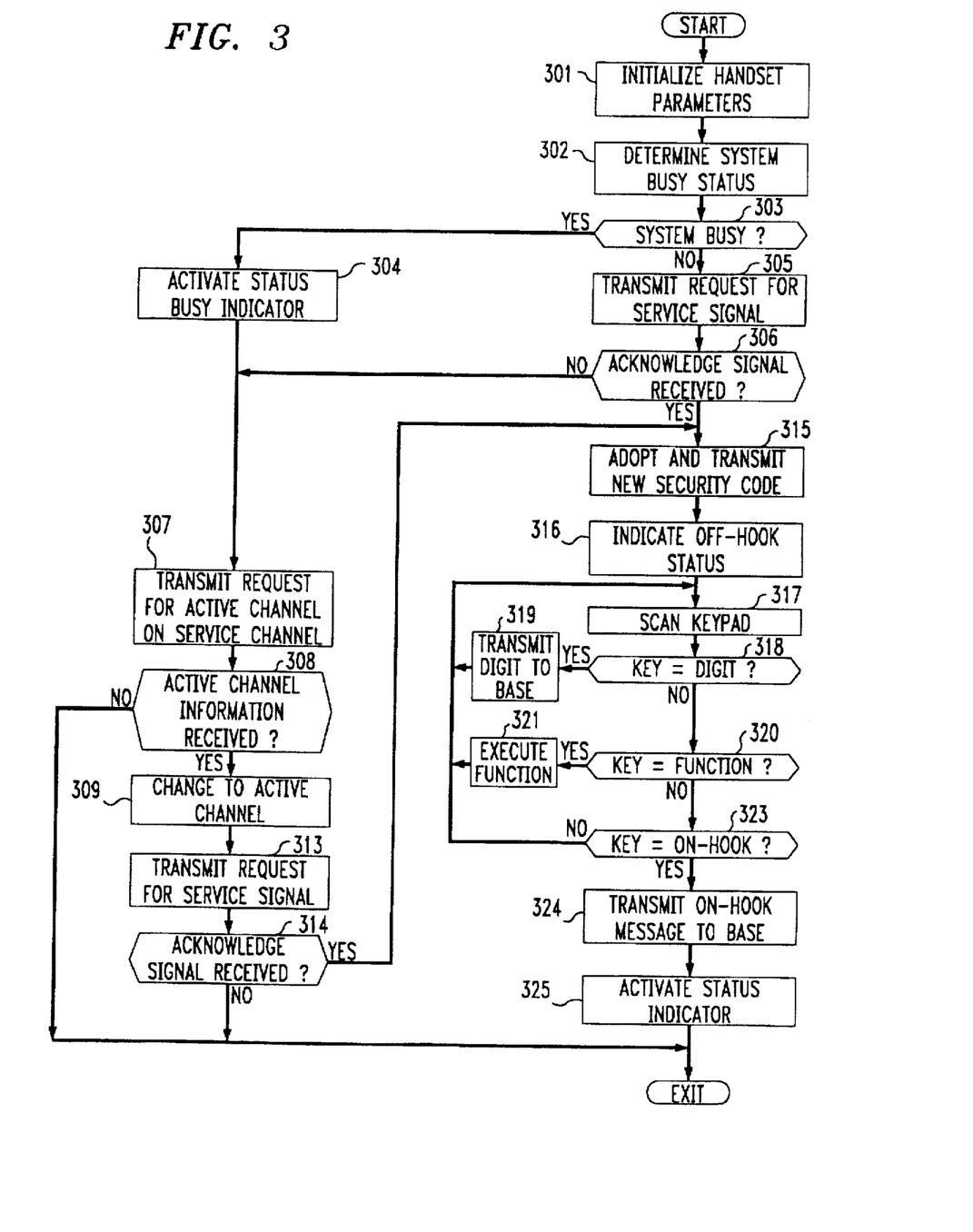
FIG. 3 shows the protocol of the cordless telephone depicting specific processes executed by a portable unit in establishing communications with the base unit, in accordance with the principles of the present invention.

Referring next to FIG. 3 there is shown a flow chart illustrating the operation of the handset unit 20 with the desired functionality in providing dial tone or some other service requested by a user at the telephone handset unit. The functions in this flow chart are advantageously provided by a process or program stored in ROM contained in control unit 220.

The process is entered in step 301 where the initializing parameters are set. These include generating a substitute security code which comprises a randomly generated number having a sufficiently large number of digits (over 64 thousand different codes) so that other cordless telephone handsets within the telephone system would be unlikely to have this same number generated for use as a security or identification code and thereby be able to interfere with an established communication link between a handset unit and the base unit. As part of the initializing step, the handset unit receiver is set on a first or active communication channel. It is this channel that the base unit 10 either last used in communicating with this handset unit or otherwise informed this handset unit that this channel was the active one selected from among a number of predetermined frequency channels for the handset unit to monitor. The handset unit 20 may be informed of the active channel by the base unit via a second or service channel assigned by the base unit for use by both the handset and base unit for synchronizing a handset unit on the correct active channel, as described later herein with reference to FIG. 4.

The active channels number between one and "N" and are limited only by the available number of allocated frequency channels allowed for cordless telephone use. In the United States, for example, there are presently 10 duplex frequency channels available for use with cordless telephones that operate within the 46 through 50 MHz frequency band. It is to be understood, however, that "N" could be any reasonable number less than or considerably greater than 10 and the frequency band also could include the recently allocated 900 MHz band allocated for cordless telephones.

From step 301, the process advances to step 302 where a check is made to determine the status of the system. When the base unit and a handset unit establish a communication link, the base unit broadcasts a "system busy" message to the other handset units. Upon receipt of the system busy message, a flag is set inside each of these other handset units. From step 302, the process advances to decision 303 where if a system busy flag has been set, the process advances to step 304. At this step 304, the status indicator 229 provides a busy indication for viewing by a user of the handset unit. If a system busy flag has not been set in the handset unit and detected in the decision 303, the process advances to step 305 where a request-for-service signal is transmitted by the handset unit on the active frequency channel. This signal includes a synchronizing signal and the security code provided by the base unit in a previous registration procedure performed between the base unit and the handset unit.

The process next advances to decision 306 where it is determined if an acknowledge signal has been received by the handset unit receiver from the base unit. The acknowledge signal from the base unit must include the same security code initially transmitted by the handset unit. Otherwise, the handset unit will not respond to the acknowledge signal. If the acknowledge signal is not received in a predetermined time period, the process advances to step 307 where a request for the active channel is transmitted by the handset unit on the service or second communication channel. As earlier indicated herein, it is this channel that is used by the base unit and handset unit for identifying the current active channel. Any handset unit that attempts to communicate with the base unit and fails to receive a response will transmit a request on the fixed service channel requesting the current active channel from the base unit. The active channel request is similarly requested in the process as it advances from step 304 to step 307. Since it is possible that a handset unit may have the wrong system busy state because it missed a "system-not-busy" message freeing the channel, the handset unit also requests the identity of the active channel over the service channel when the system busy flag is set.

From step 307, the process advances to decision 308 where a determination is made as to whether the active channel information has been received from the base unit. If this information has not been received, the process is exited. If the active channel information has been received, the process advances to step 309 where the handset unit is set to the active channel. From step 309, the process advances to step 313 where a request-for-service signal is transmitted by the handset unit on the active frequency channel. If an acknowledge signal is not received, the process is exited.

If the appropriate acknowledge signal is received at either decision 306 or decision 314, a communications link between the handset unit and the base unit is established with the base unit providing, for example, dial tone or intercom service to the handset unit as appropriate. From either decision 306 or decision 314, the process advances to step 315 where the handset unit then adopts for its further use and sends a new or temporary substitute security code which comprises a randomly generated number selected by the handset unit. The base unit similarly adopts this substitute security code when received and, like the handset unit, uses it for all subsequent communications to the handset unit. Once the base unit and handset unit have adopted this temporary substitute security code, neither the handset unit nor the base unit will respond to or execute command functions from another otherwise similarly configured cordless unit unaccompanied by this code. From step 315, the process advances to step 316 where the handset unit provides an off-hook indication to the handset user so that the user knows that communications has been established with the base unit.

Once the communications link is established between the handset unit and a base unit, the process advances to step 317, the first step in a series of steps wherein user requests are processed. In step 317, the keypad is scanned for the entry of a digit. In decision 318, any digit entered on the keypad is detected and this digit transmitted to the base unit as reflected by step 319. The information transmitted to the base unit in this step, as well as other steps in this part of the routine, is provided in the form of an opcode message and contains the temporary substitute security code from the handset unit and data representative of the digit entered on the keypad.

If the entry of a digit is not detected on the keypad in decision 318, the process advances to decision 320 which monitors the activation of function keys. Function keys provide local enhancements and convenience to the handset unit. Function keys on the handset unit include such functions as switchhook flash, channel change, base page and redial, for example. If the depression of a function key is detected by decision 320, the process advances to step 321 where the function is executed.

If the depression of a function key is not detected by decision 320, the process advances to decision 323 which looks for a depression of the on-hook key reflecting that the user desires to terminate the existing call. If this on-hook key has not been depressed, the process returns to step 317 and repeats this routine. If this on-hook key has been depressed, however, the process advances to step 324 where the appropriate opcode message is transmitted to the base unit, thereby releasing it from this handset unit. Next the process advances to the status indicator step 325 where an on-hook indication is provided to the user of the handset unit. This status indicator reflected in step 325 is multifold in functionality and also provides an indication that a communications link between the handset unit and a base unit cannot be established because the handset unit is outside of the reception range of a base unit. From the status indicator step 325, the process is exited.

Figure 4:
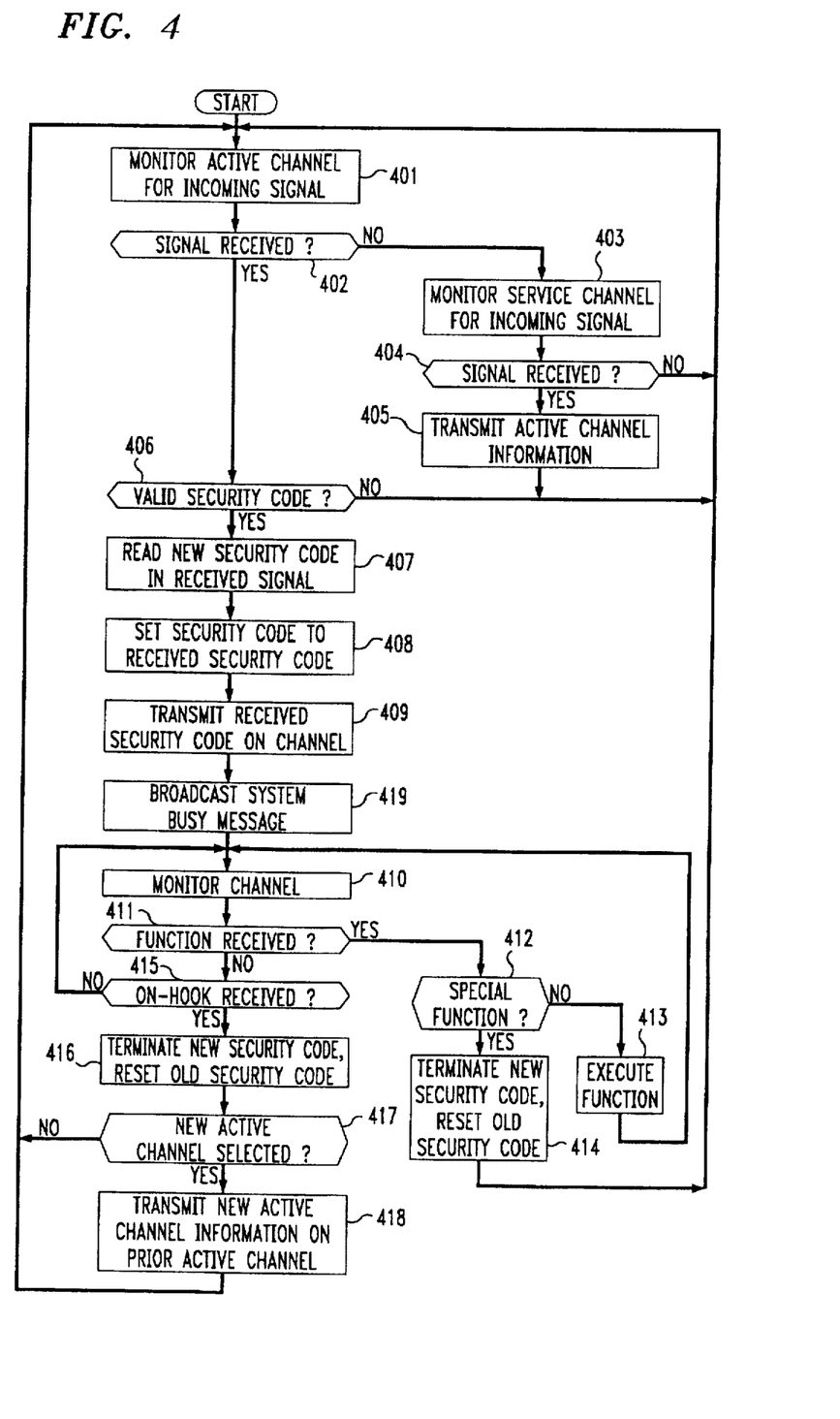
FIG. 4 shows the protocol of the cordless telephone depicting the specific processes executed by the base unit in establishing communications with one of the multiple portable units, in accordance with the principles of the present invention.

Referring next to FIG. 4 there is shown a flow chart illustrating the operation of the base unit 21 with the desired functionality in establishing communications with a handset unit requesting some type of telephone service. The functions in this flow chart are advantageously provided by a process or program stored in ROM contained in control unit 120.

The process is entered in step 401 where the active or selected first communication channel is monitored by the base unit for receipt of a request-for-service signal from one of the multiple handset units. The process next advances to decision 402 where receipt of a request-for-service signal is determined. If a request-for-service signal has not been received, the process advances to step 403 where the service or selected second communication channel is monitored by the base unit for receipt of a request-for-service signal from one of the multiple handset units. If a signal is received on this service channel, as determined by the decision 404, the process advances to step 405 where the active or first communication channel information is transmitted to the requesting handset unit. From the step 405, the process returns to step 401.

If a request-for-service signal is received, as determined by the decision 402, the process advances to decision 406 where the security code in the request-for-service signal is examined and determined to be valid or invalid. If invalid, the process returns to step 401. If valid, the base unit then receives from the handset unit in step 407 the new or temporary substitute security code which it stores in temporary memory, as provided in step 408, for use in subsequent communications with the handset unit requesting service. This code is then transmitted on the active channel in step 409 back to the handset unit requesting service so that this handset unit is informed that the base unit has adopted its security code. With the successful completion of these steps, the base unit is seized by the handset unit and operates as a dedicated base unit providing dial tone or other requested service to the handset unit and establishing a communications link over the active channel. From step 409, the process advances to step 419 where a system-busy message is broadcast to the other handset units using once again the common security code then shared by the base unit and the other handset units not then involved in the communications link with the base unit.

Most communications over the established communications link between a handset unit and the base unit is in the form of opcode messages and include the common temporary security code then shared by the base unit and the handset unit. As the base unit ignores any inadvertent message signals on its active channel that do not include this temporary security code then associated with the handset unit, in the same manner, the handset unit ignores any inadvertent message signals on the active channel that are not accompanied by its security code.

Once the communications link has been established, the process advances from step 419 to step 410 where it monitors the active channel for receipt of requested functions for execution. When a function request is received, the process advances to decision 412 where a determination is made as to whether the function request is a special function request, which requires terminating the use of the new security code and reinserting the old security code, or a normal function request which does not affect the security code setting in the base unit. Thus if the function request is a special one, the process advances to step 414 where use of the new security code is terminated and the old security code reinstated. If the function request is a normal function request, however, the process advances to step 413 where the function request is executed.

By way of illustration of a special function request, one possible opcode message from the handset unit to the base unit is a request to enter the standby mode which enables a telephone conversation to be switched to a user at a second handset unit from a first handset unit. Thus upon receipt of this request, the base unit puts the telephone call that it is then bridging between a first handset unit and the central office on hold, drops the existing communications link and permits a second handset unit to go-off hook and continue a conversation that was started with this first handset unit. This is possible since in the execution of this function request, the temporary security code is dropped and any handset unit, sharing the same security code received during registration with the first handset unit, that goes off-hook while the base unit is held in its standby state, is able to obtain service by executing this process with the base unit beginning with step 401. For other normal function requests such as processing any digit received from the handset unit then in use with the base unit, the temporary security code is not terminated, but rather remains in active memory for subsequent use by both the base unit and the handset unit with which it has established communications. Such digit function request is detected and translated to a dual-tone-multiple-frequency signal in the base unit and then transmitted to the central office over the tip-ring lines 101 and 102. After a normal function is executed in step 413, the process then returns to the routine at step 410.

If a function request is not received at step 411, the process advances to decision 415 which looks for an on-hook opcode message reflecting that the user desires to terminate the call. If this opcode message is not received, the process returns to step 410 and repeats this routine. If this opcode message is received, however, the base unit is released and the process advances to step 416 where the new security code is replaced in memory by the old security code. As part of this step, the base unit also broadcasts the system-not-busy message to all of the handset units. From step 416, the process advances to decision 417 where a decision is made as to whether a new active channel has been selected by a handset unit or the base unit because of, for example, disturbances on a previously selected active channel. In order to inform all of the handset units of the new active channel, a channel change command is transmitted in step 418 to all of the handset units informing these units of the new active channel. A channel change process suitable for use herein is described in U.S. Pat. No. 5,044,010 which issued to R. Frenkiel et al., on Aug. 27, 1991, this patent being incorporated herein by reference. From step 418, the process returns to step 401 where the base unit once again begins to monitor the active channel and then the service channel for a signal from any one of the multiple handset units.

Figure 5:
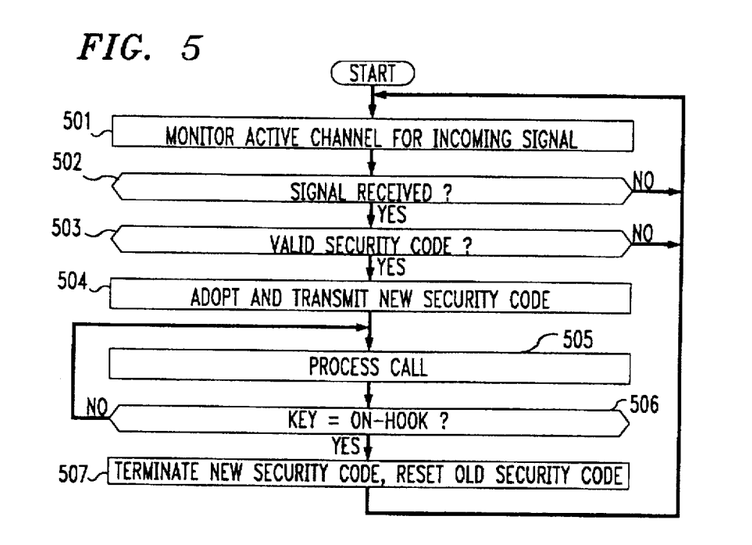
FIG. 5 shows the protocol of the cordless telephone depicting additional specific processes executed by a portable unit in establishing communications with the base unit, in accordance with the principles of the present invention.

Referring next to FIG. 5 there is shown a flow chart illustrating an additional operation of the handset unit 20 with the desired functionality. The functions in this flow chart are advantageously provided by a process or program stored in ROM contained in control unit 220.

The process is entered in step 501 where the active or selected first communication channel is monitored by the handset unit for receipt of an incoming signal from the base unit. The process next advances to decision 502 where receipt of an incoming signal is determined. If an incoming signal has not been received, the process returns to step 501. If a signal is received, however, the process advances to step 503 where a received security code is examined and determined to be valid or invalid. If invalid, the process returns to step 501. If valid, however, the handset unit then adopts a new or temporary substitute security code in step 504 for its subsequent use in communicating with the base unit and also sends this code the base unit for its subsequent use in communicating with this handset unit. From the step 504, the process advances to step 505 where the call is processed in the manner described in both the decisions and steps 316 through 321 as shown in FIG. 3, and earlier described herein. From step 505, the process advances to decision 506 which looks for a depression of the on-hook key reflecting that the user desires to terminate the existing call. If this on-hook key has not been depressed, the process returns to step 505 and the call continues to be processed in this step. If the on-hook key has been depressed, however, the process advances to step 507 where use of the new security code is terminated and in its place the old security code is inserted for subsequent use in the handset unit. In this routine, the appropriate on-hook opcode message is also transmitted to the base unit thereby releasing it from this handset unit. From the step 507, the process returns to the step 501 where the active channel is monitored for an incoming signal from the base unit.

Figure 6:
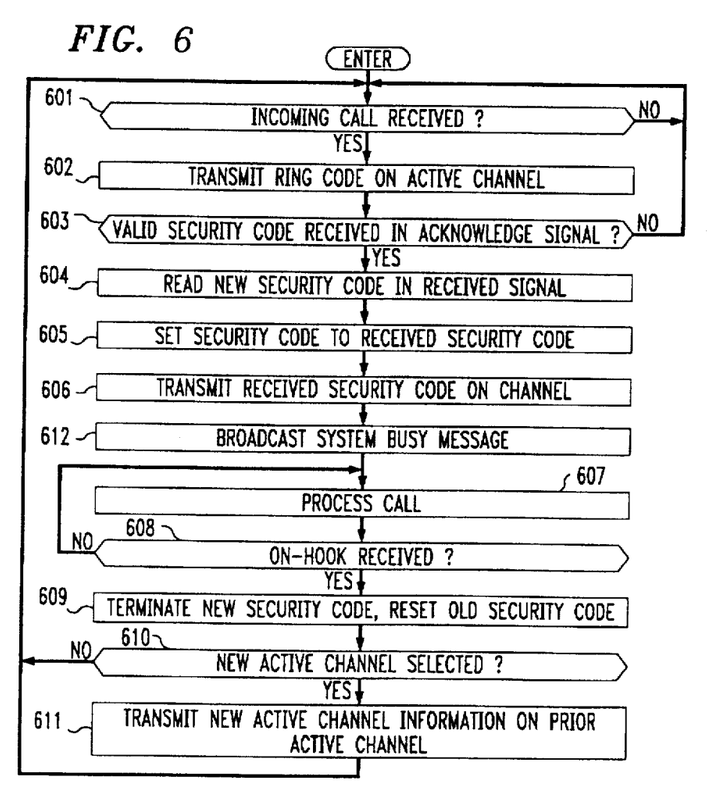
FIG. 6 shows the protocol of the cordless telephone depicting additional specific processes executed by the base unit in establishing communications with one of the multiple portable units, in accordance with the principles of the present invention.

Referring next to FIG. 6 there is shown a flow chart illustrating an operation of the base unit 21 with the desired functionality in responding to an incoming telephone call. The functions in this flow chart are advantageously provided by a process or program stored in ROM contained in control unit 120.

The process is entered in decision 601 where the base unit monitors the tip-ring lines 101 and 102 for an incoming telephone call. The process resides at decision 601 continually monitoring the tip-ting line for an incoming call. Once a call is detected at this decision, the process advances to step 602 where a transmit ring code is generated over the active channel by the base unit for receipt by the multiple handset units. This ring code comprises an opcode which also includes the common security code provided to the handset units by the base unit during registration of these units. From step 602, the process advances to decision 603 where the base unit examines the security code received in the acknowledge signal from the handset unit and determines whether this security code is valid or invalid. If invalid, the process returns to step 601. If valid, the base unit receives from the handset unit in step 604 the new or temporary substitute security code which it stores in temporary memory, as provided in step 605, for use in subsequent communications with the handset unit requesting service. This code is then transmitted on the active channel in step 606 back to the handset unit so that this handset unit is informed that the base unit has adopted its security code. With the successful completion of these steps, the handset unit effectively answers the telephone call in response to the ring code generated and transmitted by the base unit. The base unit is thus seized by the responding handset unit and operates as a dedicated base unit for this handset unit. From step 606, the base unit broadcasts the system busy message to all other handset units using the original security code provided to all of the handset units during the registration process.

From step 612, the process advances to step 607 where the call is processed by the base unit in the manner as set forth in both steps and decisions 410 through 418 described earlier herein with reference to FIG. 4. From step 607, the process advances to decision 608 where the communications link is monitored for an on-hook opcode signal from the handset unit. If an on-hook opcode signal is not received, the process returns to step 607. If an on-hook opcode signal is received, the process advances to step 609 where the new security code is terminated in the base unit and the old security code reinserted as the active code in this unit. As a part of this step, the system-not-busy message is also transmitted to all handset units. From step 609, the process advances to decision 610 where it is determined if a new active channel has been selected. If a new active channel has not been selected, the process returns to step 601. If, on the other hand, a new active channel has been selected, the process advances to step 611. At this step 611, a channel change command is transmitted to all of the handset units informing these units of the new active channel. From step 611, the process returns to step 601 where the base unit once again begins to monitor the tip-ring lines for an incoming call from the central office.

Various other modifications of this invention are contemplated and may obviously be resorted to by those skilled in the art without departing from the spirit and scope of the invention as hereinafter defined by the appended claims.

We claim:

1. In a cordless telephone system employing a plurality of handset units and a base unit, an arrangement for establishing communications between the base unit and one of the plurality of handset units, the arrangement comprising:

means in both the base unit and each of the plurality of handset units for storing a common predetermined security code used in establishing each communication link between said base unit and one of the plurality of handset units over a communication channel;

means in each one of the plurality of handset units responsive to the establishing of a communication link with said base unit for generating a substitute security code uniquely different from said predetermined security code, said substitute security code being substituted for said predetermined security code for use in subsequent communications with said base unit over said communication channel; and means for providing said substitute security code from one of the plurality of handset units to said base unit over an established communication link for use in said subsequent communications with said base unit during said established communication link, said base unit being unresponsive to communication attempts from other of the plurality of handset units unaccompanied by said substitute security code while communicating with a handset unit that provided said substitute security code.

2. The arrangement of claim 1 wherein said substitute security code is generated in said handset unit from a random number.

3. The arrangement of claim 1 wherein said providing means includes means in the handset unit for transmitting said substitute security code to the base unit.

4. The arrangement of claim 3 wherein said providing means further includes means in the base unit for receiving and temporarily storing said substitute security code.

5. The arrangement of claim 1 further including means in said base unit responsive to receipt of said substitute security code from said handset unit for transmitting to each of other of the plurality of handset units a base-unit busy signal, said busy signal providing a line-busy indication on each of said other of the plurality of handset units.

6. The arrangement of claim 5 wherein said busy signal is transmitted by said base unit to other of the plurality of handset units accompanied by said predetermined security code.

7. The arrangement of claim 6 wherein said busy signal is an opcode signal.

8. The arrangement of claim 5 further including means in said base unit operatively responsive to receipt of an on-hook signal from said handset unit for transmitting to each of said other of the plurality of handset units a base-unit available signal, said base unit available signal removing said line-busy indication from each of said other of the plurality of handset units.

9. A method of establishing communications between a base unit and one of a plurality of handset units, the method comprising the steps of:

storing a common predetermined security code in both the base unit and each of the plurality of handset units used in establishing each communication link between said base unit and one of the plurality of handset units over a communication channel;

generating a substitute security code uniquely different form said predetermined security code, in at least one of the plurality of handset units responsive to the establishing of a communication link with said base unit, said substitute security code being substituted for said predetermined security code and used in subsequent communications with said base unit over said communication channel; and providing said substitute security code from said at least one of the plurality of handset units to said base unit over an established communication link for use in said subsequent communications with said base unit during said established communication link, said base unit being unresponsive to communication attempts from other of the plurality of handset units unaccompanied by said substitute security code while communicating with said at least one handset unit that provided said substitute security code.

10. The method pursuant to claim 9 further including the step of generating said substitute security code in said at least one handset unit from a random number.

11. The method pursuant to claim 9 wherein said providing step includes the step of transmitting said substitute security code from the handset unit to the base unit.

12. The method pursuant to claim 11 wherein said providing step further includes the step of receiving and temporarily storing said substitute security code in the base unit.

13. The method pursuant to claim 9 further including the step of transmitting to each of other of the plurality of handset units a base-unit busy signal responsive to receipt of said substitute security code from said handset unit for providing a line-busy indication on each of said other of the plurality of handset units.

14. The method pursuant to claim 13 wherein said transmitting step further includes the step of transmitting said base unit busy signal to other of the plurality of handset units accompanied by said predetermined security code.

15. The method pursuant to claim 14 wherein said busy signal is an opcode signal.

16. The method pursuant to claim 13 wherein said transmitting step further includes the step of transmitting a base unit available signal to other of the plurality of handset units in response to receipt of an on-hook signal from said handset unit, said base unit available signal removing said line-busy indication from each of said other of the plurality of handset units.

17. In a cordless telephone system employing a plurality of handset units for establishing communications with a base unit in the telephone system, a handset unit comprising:

means in the handset unit for storing a predetermined security code used in establishing each communication link between said base unit and the handset unit over a communication channel said predetermined security code also being stored in said base unit;

means in the handset unit responsive to the establishing of a communication link with said base unit for generating a substitute security code uniquely different from said predetermined security code, said substitute security code being substituted for said predetermined security code for use in subsequent communications with said base unit over said communication channel; and means for providing said substitute security code from the handset unit to said base unit over an established communication link for use in said subsequent communications with said base unit during said established communication link, said base unit being unresponsive to communication attempts from other of the plurality of handset units unaccompanied by said substitute security code while communicating with said handset unit that provided said substitute security code.

18. The handset unit of claim 17 wherein said substitute security code is generated in said handset unit from a random number.

19. The handset unit of claim 17 wherein said providing means includes means in the handset unit for transmitting said substitute security code to the base unit.

20. In a cordless telephone system employing a plurality of handset units and a base unit for establishing communications with the plurality of handset units, the base unit comprising:

means for storing a predetermined security code used in establishing each communication link between said base unit and one of the plurality of handset units over a communication channel said predetermined security code also being stored in each one of the plurality of handset units;

means responsive to the establishing of a communication link with one of the plurality of handset units for receiving a substitute security code uniquely different from said predetermined security code, said substitute security code being substituted for said predetermined security code received from said one of the plurality of handset units over said communication channel; and means for adopting said substitute security code received from said one of the plurality of handset units for use in subsequent communications with said one of the plurality of handset units during said established communication link, said base unit being unresponsive to communication attempts from other of the plurality of handset units unaccompanied by said substitute security code while communicating with said one of the plurality of handset units that provided said substituted security code.

21. The base unit of claim 20 wherein said adopting means includes means for temporarily storing said substitute security code.

22. The base unit of claim 20 further including means responsive to receipt of said substitute security code from said one of the plurality of handset units for transmitting to each of other of the plurality of handset units a base-unit busy signal, said busy signal providing a line-busy indication on each of said other of the plurality of handset units.

23. The base unit of claim 22 wherein said busy signal is transmitted to other of the plurality of handset units accompanied by said predetermined security code.

24. The base unit of claim 23 wherein said busy signal is an opcode signal.

25. The base unit of claim 22 further including means operatively responsive to receipt of an on-hook signal from said one of the plurality of handset units for transmitting to each of said other of the plurality of handset units a base-unit available signal, said base unit available signal removing said line-busy indication from each of said other of the plurality of handset units.

26. A method of establishing communications between a base unit and one of a plurality of handset units, the method comprising the steps of:

storing a predetermined security code in a handset unit used establishing each communication link between said base unit and the handset unit over a communication channel said predetermined security code also being stored in the base unit;

generating in the handset unit a substitute security code uniquely different from said predetermined security code responsive to the establishing of a communication link with said base unit over the communication channel; and providing said substitute security code from the handset unit to said base unit, said substitute security code being substituted for said predetermined security code for use in subsequent communications with said base unit during said established communication link, said base unit being unresponsive to communication attempts from other of the plurality of handset units unaccompanied by said substitute security code while communicating with said handset unit that provided said substitute security code.

27. The method pursuant to claim 26 wherein said substitute security code is generated in said handset unit from a random number.

28. The method pursuant to claim 26 wherein said providing step includes the step of transmitting said substitute security code from said handset unit to the base unit over an established communication link.

29. The handset unit as in claim 17 further including means for signaling on a service channel and an active channel for establishing said communication link, said handset unit alternating in signaling on said service channel and said active channel.

30. The base unit as in claim 20 further including means for monitoring a service channel and an active channel for an incoming signal from a handset unit, said base unit alternating in monitoring both said service channel and said active channel.

* * * * *